(12) United States Patent
Prause et al.

(10) Patent No.: US 12,194,695 B2
(45) Date of Patent: Jan. 14, 2025

(54) CONVEYOR FORMING COMPOSITE STRINGERS

(71) Applicant: The Boeing Company, Arlington, VA (US)

(72) Inventors: Richard A. Prause, Charleston, SC (US); Allen Halbritter, Summerville, SC (US); Andrew E. Modin, Enumclaw, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/464,545

(22) Filed: Sep. 11, 2023

(65) Prior Publication Data

US 2023/0415432 A1    Dec. 28, 2023

Related U.S. Application Data

(62) Division of application No. 17/583,645, filed on Jan. 25, 2022, now Pat. No. 11,787,133.

(51) Int. Cl.
*B29C 70/50* (2006.01)
*B29C 70/52* (2006.01)
*B29C 70/54* (2006.01)
*B29L 31/30* (2006.01)

(52) U.S. Cl.
CPC ............ *B29C 70/526* (2013.01); *B29C 70/54* (2013.01); *B29L 2031/3076* (2013.01)

(58) Field of Classification Search
CPC ........ B29C 2043/483; B29C 2043/463; B29C 43/44; B29C 33/36; B29C 70/56; B29C 70/526; B29C 70/52
See application file for complete search history.

(56) References Cited

U.S. PATENT DOCUMENTS

| 1,523,658 | A |   | 1/1925  | Matthias |
| 2,817,875 | A | * | 12/1957 | Sampson ............... B29C 33/36 |
|           |   |   |         |          264/46.7 |
| 3,296,658 | A |   | 1/1967  | Fred et al. |
| 3,313,010 | A | * | 4/1967  | Betz ...................... B29C 44/30 |
|           |   |   |         |          425/371 |

(Continued)

FOREIGN PATENT DOCUMENTS

| EP | 0 913 216 A1 | 5/1999 |
| EP | 2 599 604 A2 | 6/2013 |

(Continued)

OTHER PUBLICATIONS

Extended European Search Report prepared by the European Patent Office in application No. EP 22 20 4390.3 dated Jun. 19, 2023.

*Primary Examiner* — Matthew J Daniels
(74) *Attorney, Agent, or Firm* — Yee & Associates, P.C.

(57) ABSTRACT

An example method of forming a composite structure is described that includes applying a laminated charge onto an expandable pallet, moving the expandable pallet at a translation rate and relative to a die conveyor that comprises a plurality of die sections, and driving the plurality of die sections on the die conveyor at an angle relative to the expandable pallet so as to drive the plurality of die sections progressively deeper into a recess defined by the expandable pallet and shape the laminated charge into at least part of a shape of the composite structure.

20 Claims, 11 Drawing Sheets

(56) References Cited

U.S. PATENT DOCUMENTS

| | | | | |
|---|---|---|---|---|
| 3,585,678 | A | * | 6/1971 | Neumann ............. B29C 44/324 |
| | | | | 425/315 |
| 3,661,481 | A | * | 5/1972 | Haviland, Jr. ........ B29C 53/043 |
| | | | | 47/29.1 |
| 3,736,081 | A | * | 5/1973 | Yovanovich .......... B29C 44/206 |
| | | | | 425/371 |
| 3,917,774 | A | | 11/1975 | Sagane et al. |
| 4,330,249 | A | | 5/1982 | Petersson et al. |
| 4,534,184 | A | | 8/1985 | Leloux |
| 5,135,382 | A | | 8/1992 | Tsuchiya et al. |
| 5,192,383 | A | * | 3/1993 | Cavin ................... B29C 70/527 |
| | | | | 156/289 |
| 6,659,020 | B1 | * | 12/2003 | Ball ......................... B32B 5/18 |
| | | | | 108/57.28 |
| 8,083,976 | B2 | | 12/2011 | Lengsfeld et al. |
| 8,562,881 | B2 | | 10/2013 | Hofmann |
| 9,028,238 | B2 | | 5/2015 | Garceau et al. |
| 11,059,235 | B2 | | 7/2021 | Kendall et al. |
| 12,049,050 | B2 | * | 7/2024 | Prause ................. B29C 70/541 |
| 2006/0231981 | A1 | | 5/2006 | Lee et al. |
| 2010/0059169 | A1 | | 3/2010 | Lengsfeld et al. |
| 2010/0086631 | A1 | | 4/2010 | Schleelein |
| 2018/0154592 | A1 | | 6/2018 | Benson et al. |
| 2021/0276274 | A1 | | 9/2021 | Halbritter et al. |
| 2022/0388256 | A1 | * | 12/2022 | Prause ................. B29C 70/541 |

FOREIGN PATENT DOCUMENTS

| | | |
|---|---|---|
| EP | 2 977 189 A1 | 1/2016 |
| EP | 3 616 889 A1 | 3/2020 |

* cited by examiner

CONVEYOR FORMING COMPOSITE STRINGERS

CROSS REFERENCE TO RELATED APPLICATION

The present disclosure is a divisional of and claims priority to U.S. application Ser. No. 17/583,645, filed on Jan. 25, 2022, now U.S. Pat. No. 11,787,133, issued Oct. 17, 2023, the entire contents of which are herein incorporated by reference.

FIELD

The present disclosure relates generally to systems and methods for forming a composite structure using an expandable pallet, and more particularly to, fabrication of composite components along a moving manufacturing line via use of the expandable pallet and a plurality of die sections on a die conveyor.

BACKGROUND

Modern aircraft designs use various components, such as stringers, to resist bending, torsional, shear, and direct loads along the fuselage of the aircraft. Stringers are typically formed from lightweight composites comprising, e.g., a tape or a fabric with fibers embedded into a resin matrix. A composite layup is processed using a forming tool to define the stringer shape. However, supporting composite layups in forming tools has been challenging. For example, one approach requires stringer layups to be pre-formed with vertical punch style forming operations and then moved to an assembly line for further processing. A cycle time associated with pre-forming methods limits a speed at which parts can be created. Other approaches require a unique forming tool for each part that needs to be fabricated requiring changing out machine tooling as needed. Still other approaches may only form one ply at a time requiring multiple passes of the forming apparatus to build up a full laminate.

What is needed is a method for fabricating stringers along a continuously moving manufacturing line to enhance efficiency.

SUMMARY

In one example, a device for forming a composite structure is described. The device includes an expandable pallet having a forming surface configured to receive thereon a laminated charge, and a die conveyor having a plurality of die sections. The plurality of die sections progressively urge the laminated charge into a recess defined by the expandable pallet as the expandable pallet is moved at a translation rate and relative to the die conveyor. The die conveyor drives the plurality of die sections at an angle relative to the expandable pallet. The plurality of die sections shapes the laminated charge into at least part of a shape of the composite structure.

In another example, a system for forming a composite structure is described. The system comprises an expandable pallet having a forming surface configured to receive thereon a laminated charge, a feed assembly line onto which the expandable pallet with the laminated charge is positioned, and a die conveyor having a plurality of die sections. The feed assembly line moves the expandable pallet in a linear motion at a translation rate. The plurality of die sections progressively urge the laminated charge into a recess defined by the expandable pallet as the expandable pallet is moved at the translation rate and relative to the die conveyor. The die conveyor drives the plurality of die sections at an angle relative to the expandable pallet. The plurality of die sections shapes the laminated charge into at least part of a shape of the composite structure.

In another example, a method for forming a composite structure is described. The method comprises applying a laminated charge onto an expandable pallet, moving the expandable pallet at a translation rate and relative to a die conveyor that comprises a plurality of die sections, and driving the plurality of die sections on the die conveyor at an angle relative to the expandable pallet so as to drive the plurality of die sections progressively deeper into a recess defined by the expandable pallet and shape the laminated charge into at least part of a shape of the composite structure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, a system and method of forming a composite structure includes applying a laminated charge onto an expandable pallet, moving the expandable pallet at a translation rate and relative to a die conveyor that includes a plurality of die sections, and driving the plurality of die sections on the conveyor. The plurality of die sections is driven at an angle relative to the expandable pallet so as to drive the die sections progressively deeper into a recess defined by the expandable pallet and shape the laminated charge into at least part of a shape of the composite structure.

Figure 1:
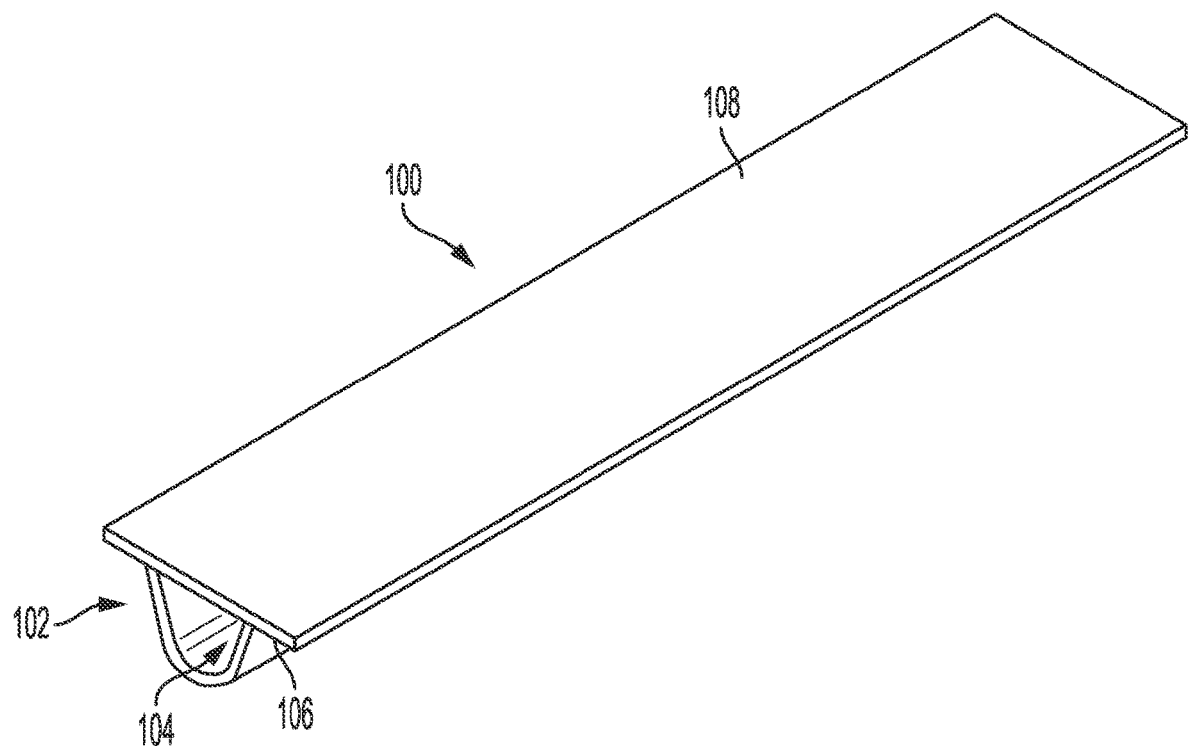
FIG. 1 illustrates an example of a composite structure (e.g., a stringer) having an internal cavity by which a mandrel including an expandable pallet may be used for fabrication, according to an example implementation.

Referring now to the figures, FIG. 1 illustrates an example of a composite structure 100 (e.g., a stringer) having an internal cavity by which a mandrel including an expandable pallet may be used for fabrication, according to an example implementation. In one arrangement, the composite structure 100 may comprise a multi-ply layup of an uncured pre-impregnated reinforcing tape or fabric (i.e., "prepreg"). In the illustrated arrangement, the composite structure 100 comprises a rounded hat section 102 forming an internal stringer cavity 104, a pair of laterally extending flange sections 106, and a substantially flat skin section 108 that is consolidated together with the flange sections 106 during curing. As those of ordinary skill in the art will recognize, alternative stringer geometries are possible.

After curing, all components shown in FIG. 1 form the composite structure 100. Within examples described herein, the composite structure 100 is fabricated using devices and systems, as described with reference to FIGS. 2-9, and a bladder is utilized to fill the stringer cavity 104 to create a hollow trapezoidal space in the composite structure 100.

Example composite material used for the composite structure 100 is generally a lightweight material, such as prepreg. The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, during fabrication, the prepreg is laid onto tooling or molding, and components are used to form the prepreg into a desired shape of the composite structure 100. The composite structure 100 could be any suitable dimension to provide various degrees of reinforcement, and could comprise any number of plies of prepreg.

Figure 2:
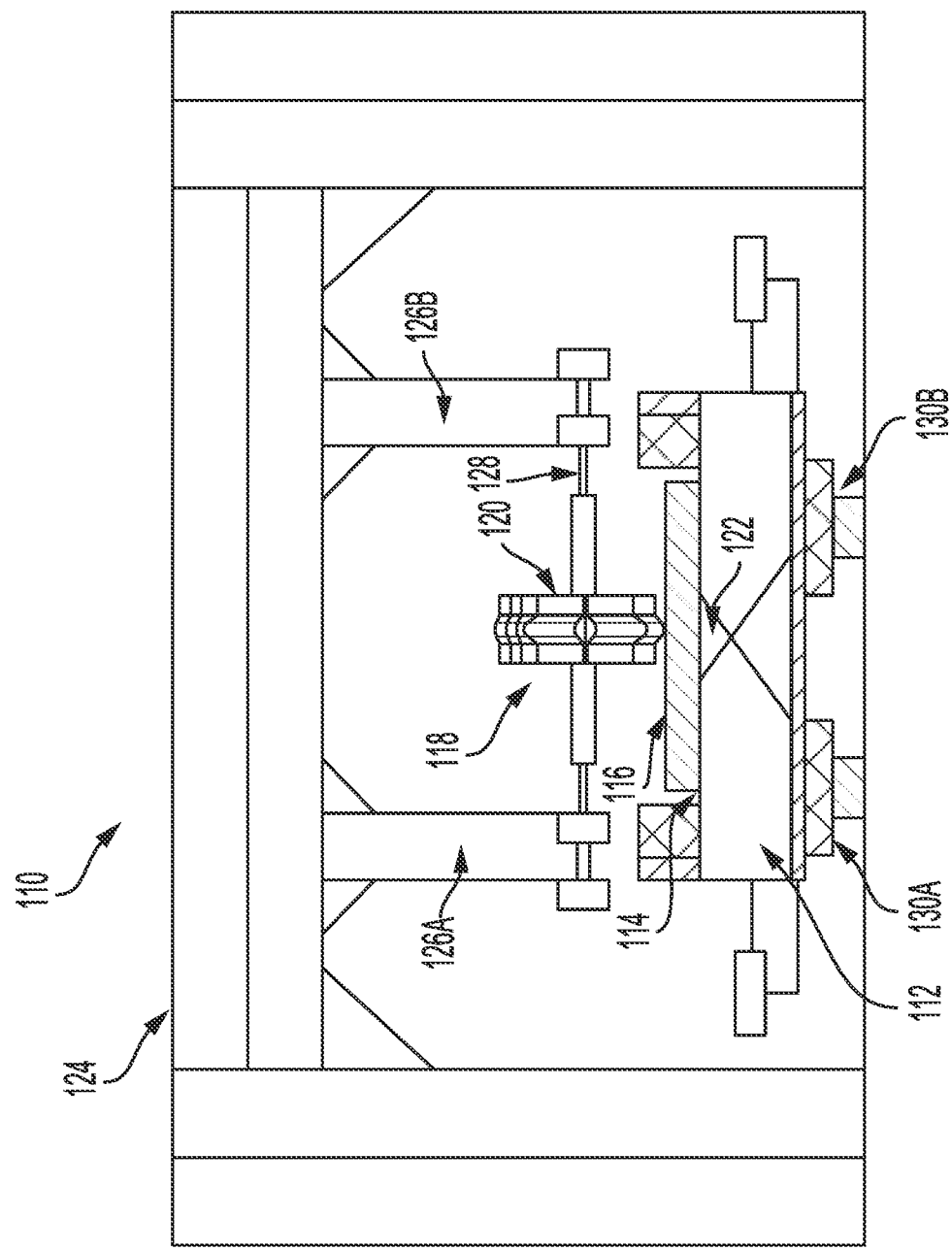
FIG. 2 illustrates an end view of an example of a device for forming the composite structure, according to an example implementation.

FIG. 2 illustrates an end view of an example of a device 110 for forming the composite structure 100, according to an example implementation. The device 110 includes an expandable pallet 112 having a forming surface 114 configured to receive thereon a laminated charge 116, and a die conveyor 118 having a plurality of die sections 120 for progressively urging the laminated charge 116 into a recess 122 defined by the expandable pallet 112 as the expandable pallet 112 is moved at a translation rate and relative to the die conveyor 118. The die conveyor 118 drives the plurality of die sections 120 at an angle relative to the expandable pallet 112. The plurality of die sections 120 shape the laminated charge 116 into at least part of a shape of the composite structure 100.

In FIG. 2, an end view of the device 110 is shown. As such, only some of the die sections of the plurality of die sections 120 are shown.

The device 110 also includes a frame 124 with support structures 126a-b holding the die conveyor 118. Although the frame 124 is shown overhead of the expandable pallet 112, other configurations are possible as well, such as the frame 124 being mounted on sides of (e.g. adjacent to) the expandable pallet 112.

The die conveyor 118 includes a guide bar on which the plurality of die sections 120 rotate and a wheel. The wheel is installed on a shaft 128 and is driven by a motor connected to the shaft 128. Motion of the wheel, in turn, drives the plurality of die sections 120 around the guide bar.

The device 110 also includes rails 130a-b with bearing trucks driven by a motor connected to the device 110, and the expandable pallet 112 is positioned on top of the rails 130a-b. As the bearing trucks are driven by the motor, similar to a conveyor belt, the expandable pallet 112 is moved in a linear motion underneath the die conveyor 118. Only a single expandable pallet is shown in FIG. 2. However, the device 110 includes multiple expandable pallets.

Figure 3:
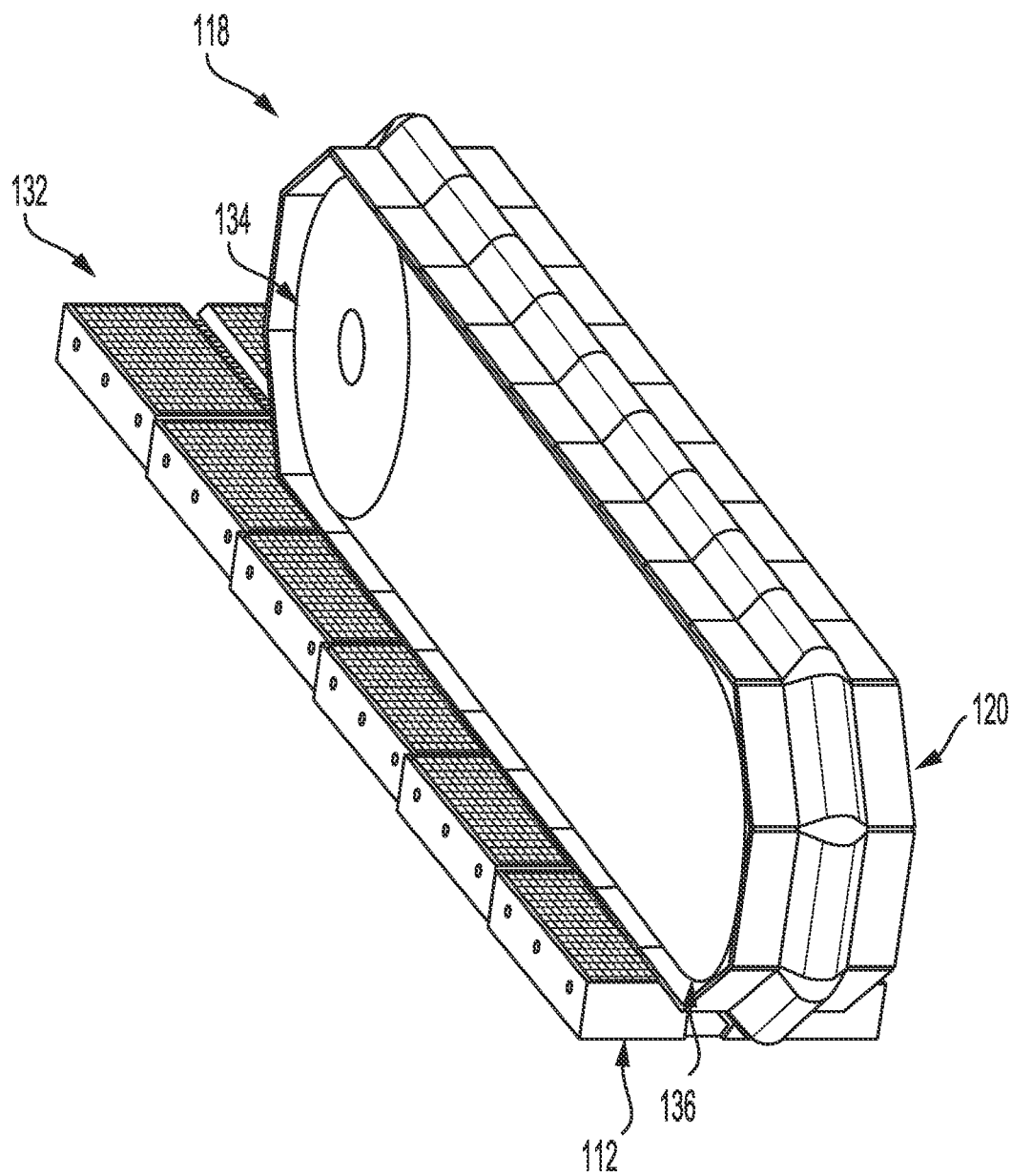
FIG. 3 illustrates a perspective view of a portion of the device for forming the composite structure 100, according to an example implementation.
Figure 4:
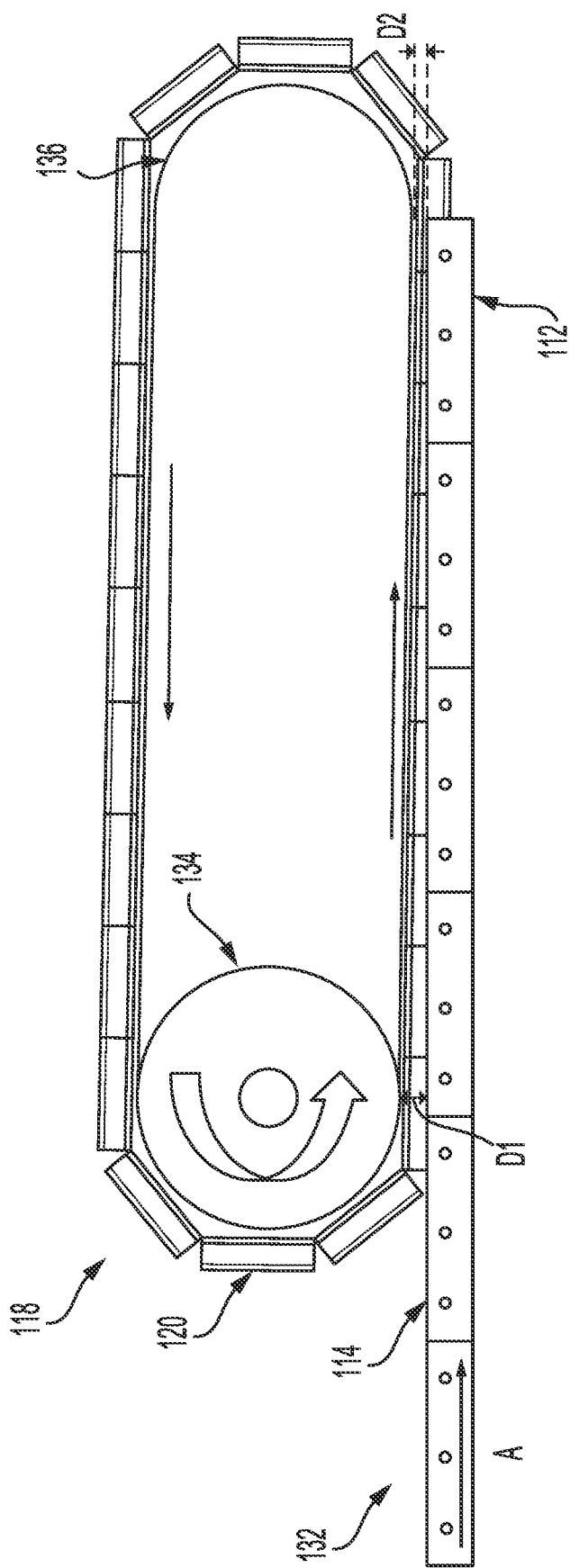
FIG. 4 illustrates a side view of a portion of the device for forming the composite structure 100, according to an example implementation.
Figure 5:
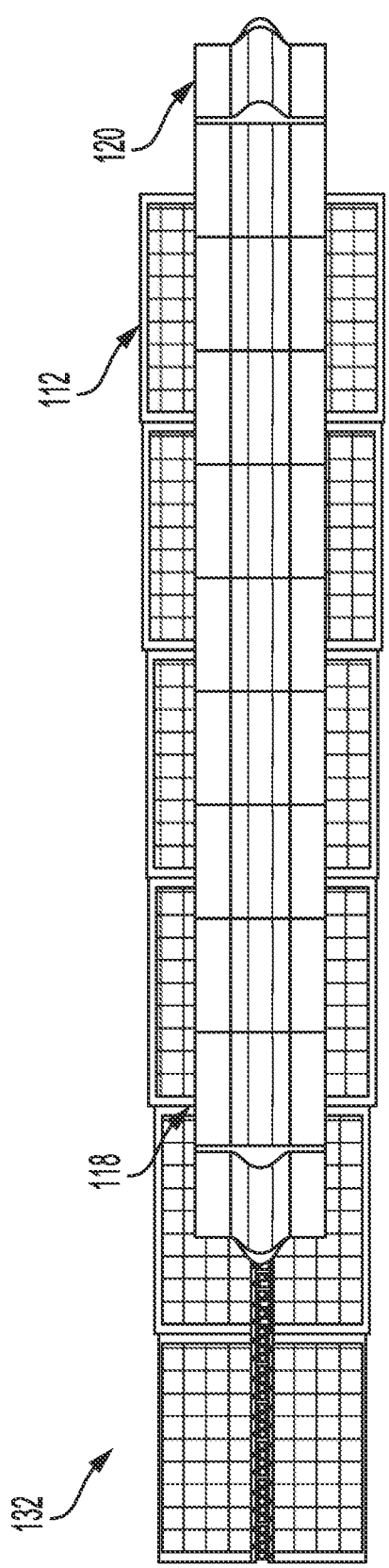
FIG. 5 illustrates a top view of the portion of the device for forming the composite structure 100, according to an example implementation.
Figure 6:
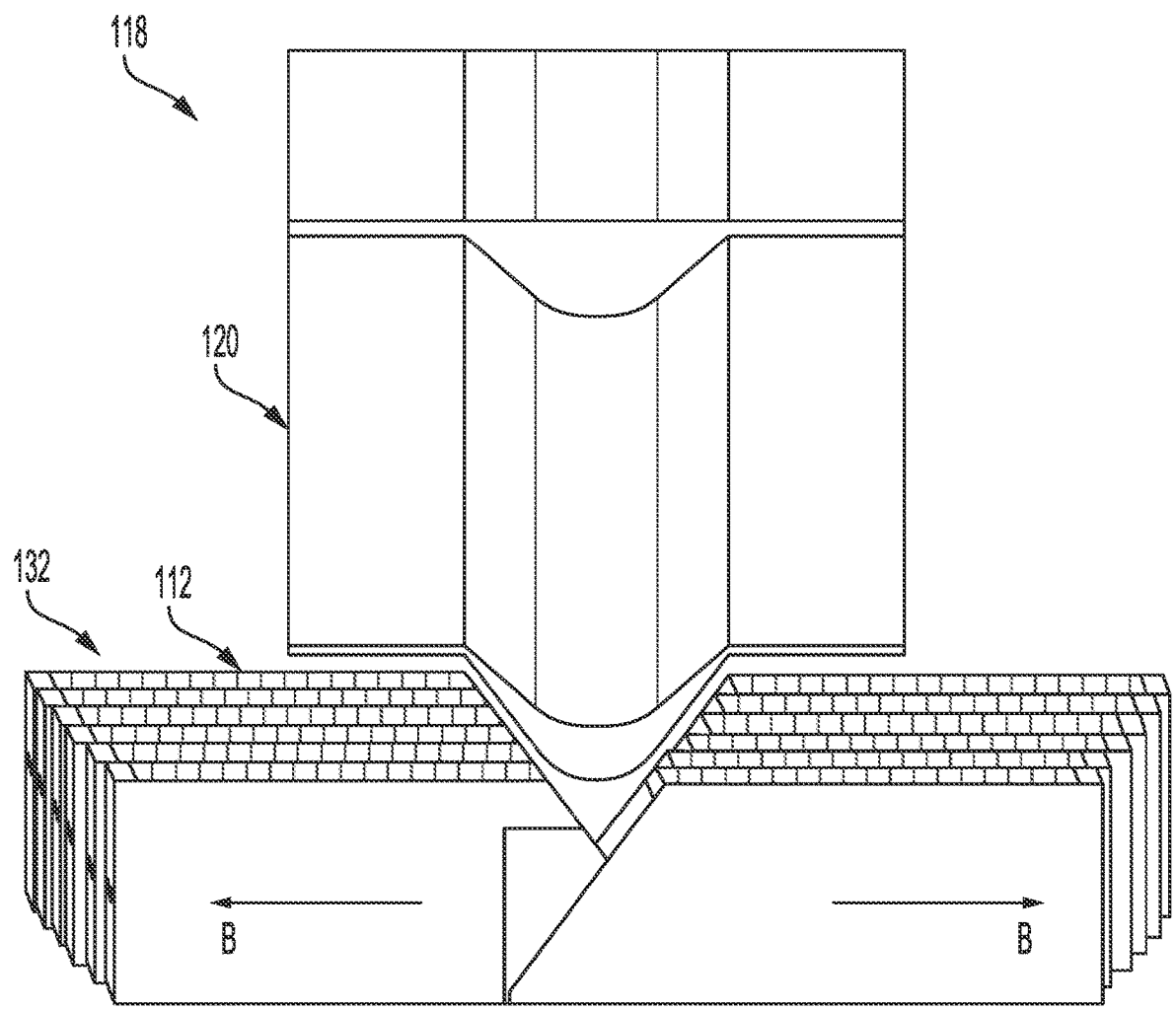
FIG. 6 illustrates a back view of the portion of the device for forming the composite structure 100, according to an example implementation.

FIG. 3 illustrates a perspective view of a portion of the device 110 for forming the composite structure 100, according to an example implementation. FIG. 4 illustrates a side view of a portion of the device 110 for forming the composite structure 100, according to an example implementation. FIG. 5 illustrates a top view of the portion of the device 110 for forming the composite structure 100, according to an example implementation. FIG. 6 illustrates a back view of the portion of the device 110 for forming the composite structure 100, according to an example implementation. And FIG. 7 illustrates a front view of the portion of the device 110 for forming the composite structure 100, according to an example implementation.

Figure 7:
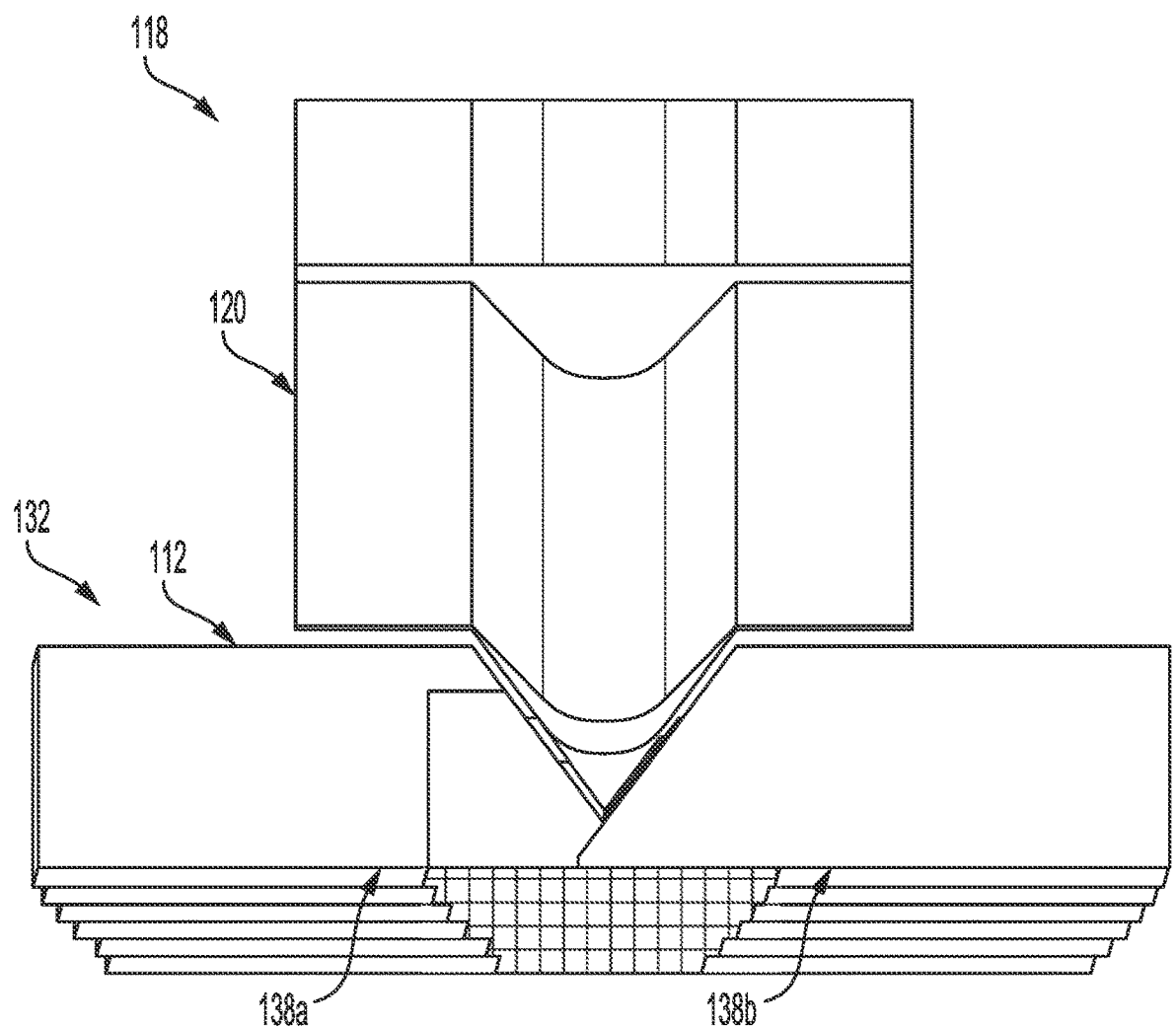
FIG. 7 illustrates a front view of the portion of the device 110 for forming the composite structure 100, according to an example implementation.

FIGS. 3-7 illustrate the die conveyer 118 and a plurality of expandable pallets 132. The plurality of expandable pallets 132 includes the expandable pallet 112. The back view shown in FIG. 6 is a view from a side of the die conveyer 118 from which the expandable pallet 112 enters underneath the die conveyer 118. The front view shown in FIG. 7 is a view from a side of the die conveyer 118 from which the expandable pallet 112 exits from underneath the die conveyer 118.

As shown in FIGS. 3 and 4, the die conveyor 118 includes a wheel 134 and guide bar 136. The wheel 134 is drivable for rotating the plurality of die sections 120 around the guide bar 136. For instance, the wheel 134 can be a sprocket having teeth that engage the plurality of die sections 120 or a chain or track to which the plurality of die sections 120 are coupled. Further, the wheel 134 and the guide bar 136 are configured such that the die conveyor 118 drives the plurality of die sections 120 at an angle relative to the plurality of expandable pallets 132. For example, a first end of the guide bar 136 is offset from the forming surfaces of the plurality of expandable pallets by a first distance D1. A second end of the guide bar 136 is offset from the forming surfaces of the plurality of expandable pallets by a second distance D2. The first distance D1 is greater than the second distance D2 such that the die conveyer 118 drives the plurality of die sections 120 at the angle relative to the expandable pallet 112. With this configuration, as the plurality of expandable pallets 132 are moved in a linear motion A underneath the die conveyer 118, the plurality of die sections 120 gradually press the laminated charge 116 into the recesses of the plurality of expandable pallets. For example, as the expandable pallet 112 advances from beneath the wheel 134 and towards the opposite end of the guide bar 136, the plurality of die sections press the laminated charge 116 deeper into the recess 122.

The angle at which the die conveyer 118 drives the plurality of die sections 120 relative to the plurality of expandable pallets 132 can vary depending on the desired implementation. For instance, the angle may be three degrees, five degrees, ten degrees, etc.

In some examples, the height of the die conveyer 118 is movable in a vertical direction (e.g., perpendicular to the linear motion A of the expandable pallet 112). In one example, the vertical movement is controlled passively with a spring(s) or air cylinder(s) coupled to the die conveyor 118. In another example, the vertical movement is controlled actively by a motor(s). The vertical movement can assist with and accommodate changes in laminate thickness (e.g., ply drops). Additionally or alternatively, the height of the rails 130a-b is movable in the vertical direction by way of spring(s), air cylinder(s), or motor(s) coupled to the rails 130a-b.

In some examples, the die conveyor 118 drives the plurality of die sections 120 at a same rate as a translation rate of the expandable pallet 112. As an example, the translation rate for both the plurality of die sections 120 and the expandable pallet may be six meters/minute. Driving the plurality of die sections 120 at the same rate as the translation rate of the expandable pallet 112 can help reduce shear between the laminated charge 116 and the plurality of die sections 120.

As shown in FIG. 7, the expandable pallet 112 includes a pair of pallet members 138a-b, which are two separate blocks, that slide into and away from each other due to interlocking interior features. In a configuration where the pair of pallet members 138a-b are interlocked together, the recess 122 is a small area as shown in FIG. 2. Thus, the pair of pallet members 138a-b interlocked with one another define the recess 122 therebetween. As the pair of pallet members 138a-b slide apart, the recess 122 grows larger. Thus, the pair of pallet members 138a-b are movable and translate relative to one another for modifying a size and configuration of the recess 122. Similarly, other pallet members of the plurality of expandable pallets 132 include respective pairs of pallet members.

As the expandable pallets move in the linear motion A, the plurality of die sections 120 progressively urge the laminated charge 116 (not shown in FIGS. 3-7) into the recesses of the expandable pallets. As the die sections push deeper into the expandable pallets, the recesses progressively expand in a direction B (shown in FIG. 6). The direction B is substantially perpendicular to the linear motion A. Urging the laminated charge 116 into the recess 122 of the expandable pallet 112, for example, causes the pair of pallet members 138a-b to move outward relative to one another and progressively expand the recess 122.

Figure 8:
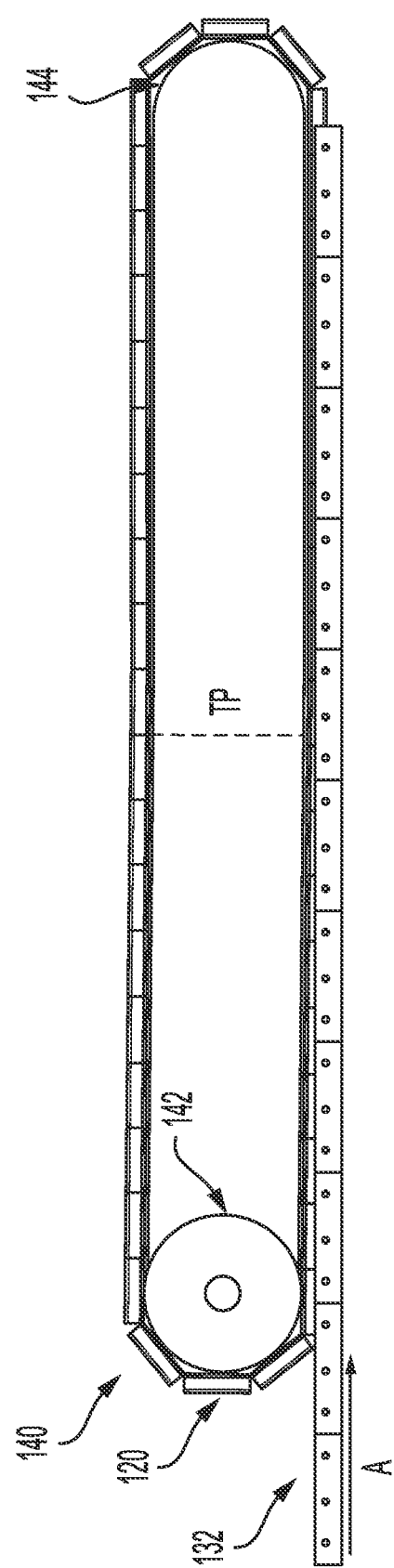
FIG. 8 illustrates a side view of another example configuration of a die conveyor, according to an example implementation.

FIG. 8 illustrates a side view of another example configuration of a die conveyor, according to an example implementation. As shown in FIG. 8, die conveyer 140 includes a wheel 142 and a guide bar 144. Die conveyer 140 drives the plurality of die sections 120 at an angle relative to the plurality of expandable pallets 132 between wheel 142 and a transition point TP. After driving the plurality of die sections 120 at the angle, die conveyer 140 then drives the plurality of die sections 120 at a stationary height with respect to the forming surfaces of the plurality of expandable pallets 132 so as to add a dwell time after the laminated charge 116 is shaped into at least part of the shape of the composite structure 100. During the dwell time, the plurality of die sections 120 hold the position of the laminate charge 116 in the shape of the composite structure 100.

In some examples, rather than utilizing a die conveyor with both an angled section and a flat section, the plurality of expandable pallets 132 can be moved underneath a separate die conveyor (not shown) that drives a plurality of die sections at a stationary height relative to the plurality of expandable pallets after moving the plurality of expandable pallets underneath the die conveyor 118.

In some examples, after fabricating the composite structure 100, the composite structure 100 is crated off-line and then fed into a forming station for further processing. At this stage, the composite structure 100 is pre-formed and additional steps of bladder installation, noodle extrusion, compaction, and curing are performed. Thus, in some examples for fabrication, the composite structure 100 remains in distinct production areas while waiting to move to a next stage of production.

In other examples, a system is leveraged for high-rate stringer fabrication along a continuously moving manufacturing line to produce a number of composite structures continuously, such as about a few per minute. Each of the composite structures may include a desired length stringer package ready for curing.

Figure 9:
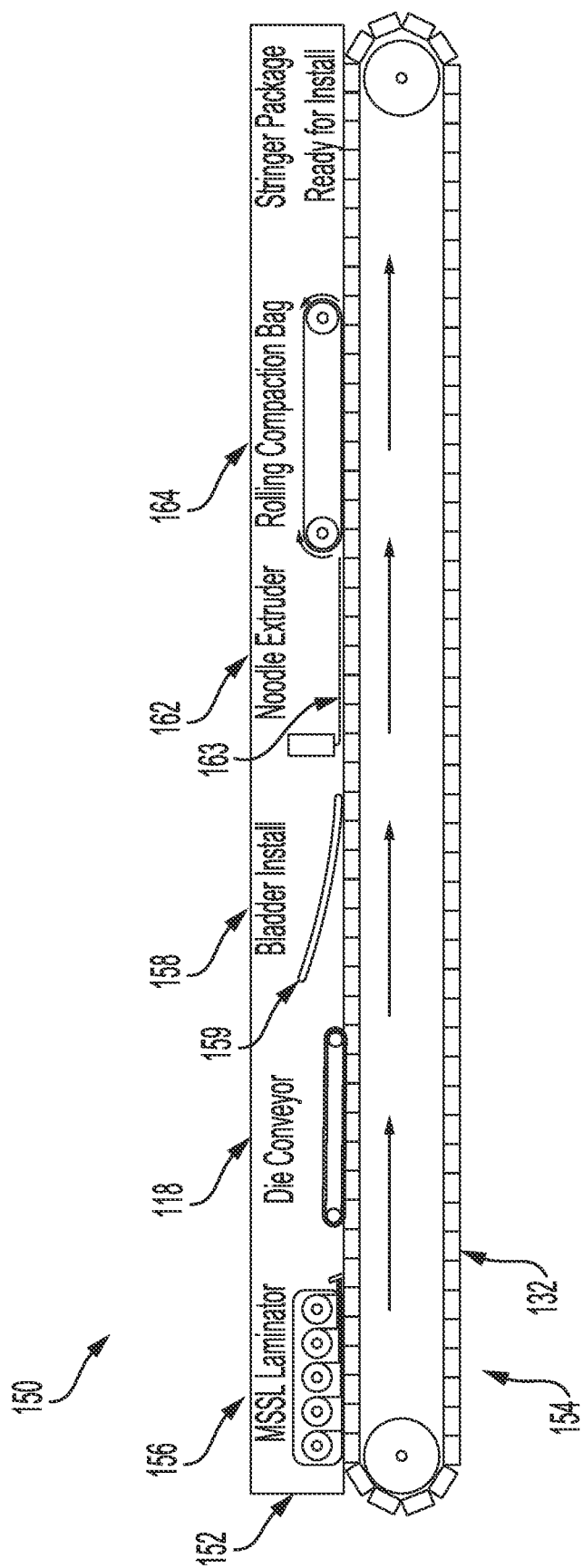
FIG. 9 illustrates a side conceptual view of a system for forming a composite structure, according to an example implementation.

FIG. 9 illustrates a side conceptual view of a system 150 for forming a composite structure, according to an example implementation. The system 150 includes the die conveyor 118, the plurality of expandable pallets 132 having forming surfaces configured to receive thereon the laminated charge 116, and a feed assembly line 152 onto which the plurality of expandable pallets 132 are positioned. The feed assembly line 152 moves (e.g., continuously moves) the plurality of expandable pallets 132 in a linear motion at a translation rate. In some examples, the translation rate is the same rate at which the die conveyer 118 drives the plurality of die sections 120.

The feed assembly line 152 includes a number of different stations for fabricating and then post-processing of the laminated charge 116 to create the composite structure 100. Each of the different stations resides over a portion of a conveyor belt 154 that moves the expandable pallets of the plurality of expandable pallets 132 in the linear motion relative to each station.

A first station includes a laminator 156 that applies a full set of plies at once onto a group of expandable pallets. The full set of plies is the laminated charge 116.

The conveyor belt 154 moves the plurality of expandable pallets 132 in a linear motion (as shown in FIG. 9 by the arrows to the right), and progresses the group of expandable pallets now with the laminated charge 116 positioned thereon to the next station that includes the die conveyor 118. As described, the die conveyer 118 progressively urges the laminated charge 116 into the recesses of the expandable pallets.

The conveyor belt 154 continues to move the plurality of expandable pallets 132 in a linear motion and progresses the expandable pallets, now with the laminated charge 116 urged into the recesses, to the next station that includes a bladder station 158. The bladder station 158 is positioned after the die conveyor 118 within the feed assembly line 152, and as the group of expandable pallets moves past the bladder station 158, a bladder 159 is applied onto the laminated charge 116 into a cavity formed by the die conveyor 118.

The conveyor belt 154 continues to move the plurality of expandable pallets 132 in a linear motion and progresses the expandable pallets, now with the bladder 159 installed, to the next station that includes a radius filler station 162 that is positioned after the bladder station 158 within the feed assembly line 152. As the group of expandable pallets moves past the radius filler station 162, a radius filler 163 is installed into the laminated charge 116.

Gaps or void regions can be formed by a radius of any curved pieces of the laminated charge. Such gaps or void regions are typically referred to as "radius filler regions" or "noodle regions". The radius filler station fills the radius filler regions or noodle regions with radius filler elements or "noodles" made of composite material or adhesive/epoxy material and having a generally triangular cross-section to provide additional structural reinforcement to such regions. The radius filler 163 includes carbon fiber-reinforced plastic (CFRP) that is placed by machinery into the gaps or voids as the expandable pallet 112 moves through the radius filler station 162.

The conveyor belt 154 continues to move the plurality of expandable pallets 132 in a linear motion and progresses the group of expandable pallets, now with the radius filler 163 installed, to the next station that includes a compaction station 164 that is positioned after the radius filler station 162 within the feed assembly line 152. As the expandable pallets move through the compaction station 164, the laminated charge 116 is compacted into a completed package.

Thus, the system 150 operates the feed assembly line 152 by continuously moving the plurality of expandable pallets 132 in the linear motion enabling fabrication of composite structures at a rate of about multiple meters per minute. The continuously moving assembly line enables a substantial increase in a rate of production and manufacturing efficiency of composite stiffeners because it does not involve any or as much stopping for alternate tooling to be placed.

Although the conveyer belt 154 is shown as having an upper track and a lower, return track, the example is not meant to be limiting. In other examples, the conveyer belt 154 can be replaced with a carousel conveyer (not shown) that moves the plurality of expandable pallets 132.

Figure 10:
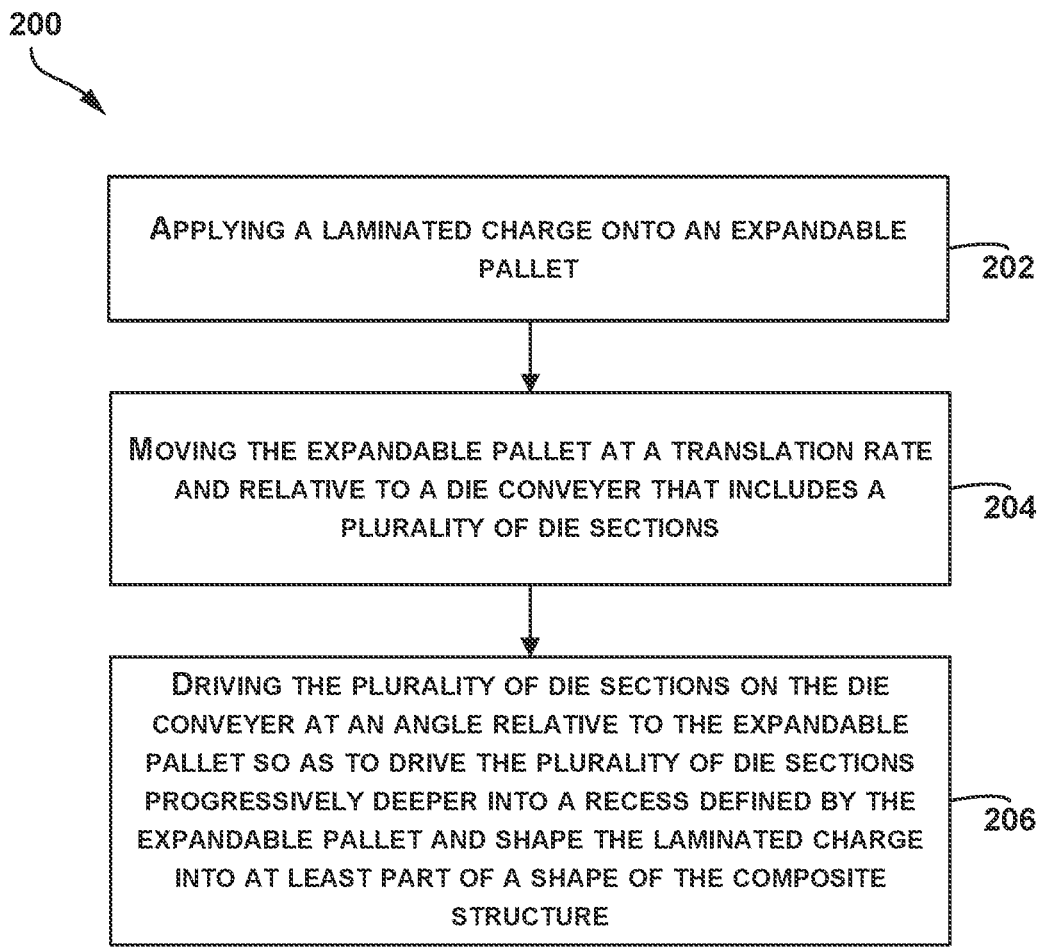
FIG. 10 illustrates a flowchart of an example of a method for forming a composite structure, according to an example implementation.

FIG. 10 is a flowchart illustrating an example of a method 200 of forming a composite structure, according to an example implementation. Method 200 shown in FIG. 10 presents an example of a method that could be used with the system 150 or with components of thereof. Further, the functions described with respect to FIG. 10 may be supplemented by, replaced by, or combined with functions and features described above with respect to FIGS. 2-9, for example. Further, devices or systems may be used or configured to perform logical functions presented in FIG. 8.

In one example, the method 200, and any of the features shown in FIGS. 2-9, is considered a process in which a composite structure is formed using the die conveyer 118 or any of the die conveyers described herein.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 includes one or more operations, functions, or actions as illustrated by one or more of blocks 202-206. Further, blocks of FIGS. 11 and 12 may be performed in accordance with one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 200 may be represented in program code or circuitry used for controlling robotic mechanisms for forming the composite structure 100. While method 200 and variations thereof may be executed automatically using, for example, one or more robotic armatures controlled by program code operating in accordance with the method 200, some tasks may be performed manually. Thus, within examples, certain functionality described with respect to the method 200 may be performed automatically while other portions can be performed manually. Alternatively, all blocks of the method 200 may be performed automatically or all blocks of the method 200 may be performed manually.

At block 202, the method 200 includes applying the laminated charge 116 onto the expandable pallet 112.

At block 204, the method 200 includes moving the expandable pallet 112 at a translation rate and relative to the die conveyer 118, 140 that includes the plurality of die sections 120. In one example, a die section of the plurality of die sections 120 defines a profile complementary to a desired shape of the composite structure 100. In some examples, the composite structure 100 is a stringer.

Figure 11:
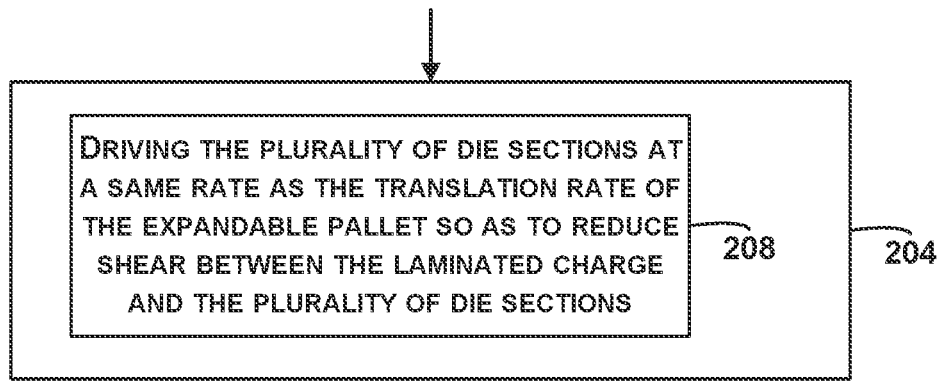
FIG. 11 illustrates a flowchart of functions for use with the method shown in FIG. 10, according to an example implementation.

FIG. 11 illustrates a flowchart of functions for use with the method 200 shown in FIG. 10, according to an example implementation. In particular, FIG. 11 illustrates block 208, which includes an example function for driving the plurality of die sections 120 on the die conveyer 118, 140 including driving the plurality of die sections 120 at a same rate as the translation rate of the expandable pallet 112 so as to reduce shear between the laminated charge 116 and the plurality of die sections 120.

Figure 12:
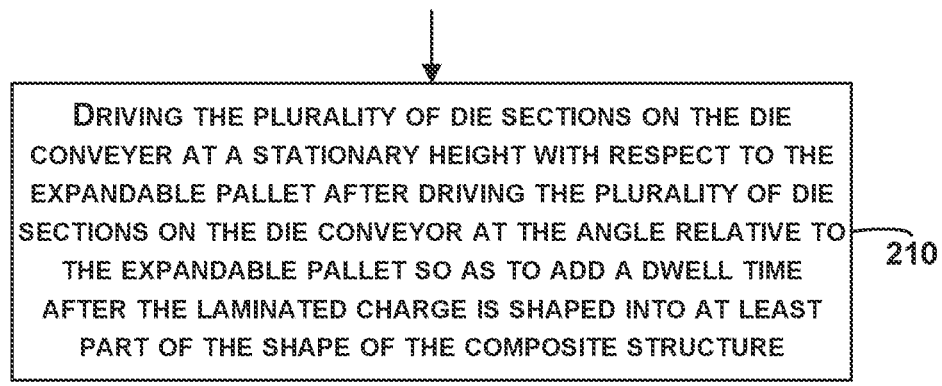
FIG. 12 illustrates a flowchart of additional functions for use with the method shown in FIG. 10, according to an example implementation.

FIG. 12 illustrates a flowchart of additional functions for use with the method 200 shown in FIG. 10, according to an example implementation. In particular, FIG. 12 illustrates block 210, which includes an example function for driving the plurality of die sections 120 on the die conveyer 140 at a stationary height with respect to the expandable pallet 112 after driving the plurality of die sections 120 on the die conveyer 140 at the angle relative to the expandable pallet 112 so as to add a dwell time after the laminated charge 116 is shaped into at least part of the shape of the composite structure 100.

Example devices, systems, and methods described herein support fabrication of composite structures along a continuously moving manufacturing line, which significantly enhances efficiency, reduces time to form the composite structures, and reduces space required for fabrication. Altogether, a cost reduction in composite structure fabrication is also achievable with the example devices, systems, and methods described herein.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for forming a composite structure, the method comprising:
   applying a laminated charge onto an expandable pallet;
   moving the expandable pallet at a translation rate and relative to a die conveyor that comprises a plurality of die sections; and
   driving the plurality of die sections on the die conveyor at an angle relative to the expandable pallet so as to drive the plurality of die sections progressively deeper into a recess defined by the expandable pallet and shape the laminated charge into at least part of a shape of the composite structure, wherein a first end of the die conveyor is offset from a forming surface of the expandable pallet onto which the laminated charge is applied by a first distance and a second end of the die conveyor is offset from the forming surface of the expandable pallet by a second distance and the first distance is greater than the second distance such that the die conveyor drives the plurality of die sections at the angle relative to the expandable pallet.

2. The method of claim 1, wherein:
   moving the expandable pallet comprises moving the expandable pallet in a linear motion underneath the die conveyor; and
   as the expandable pallet moves in the linear motion underneath the die conveyor, gradually pressing the laminated charge into the recess of the expandable pallet by the plurality of die sections.

3. The method of claim 1, wherein:
   moving the expandable pallet comprises moving the expandable pallet in a linear motion underneath the die conveyor; and
   as the expandable pallet moves in the linear motion underneath the die conveyor, pressing the laminated charge deeper into the recess defined by the expandable pallet by the plurality of die sections.

4. The method of claim 1, wherein driving the plurality of die sections on the die conveyor comprises driving the plurality of die sections at a same rate as the translation rate of the expandable pallet so as to reduce shear between the laminated charge and the plurality of die sections.

5. The method of claim 1, wherein a die section of the plurality of die sections defines a profile complementary to a desired shape of the composite structure.

6. The method of claim 1, wherein the composite structure is a stringer.

7. The method of claim 1, further comprising driving the plurality of die sections on the die conveyor at a stationary height with respect to the expandable pallet after driving the plurality of die sections on the die conveyor at the angle relative to the expandable pallet so as to add a dwell time after the laminated charge is shaped into at least part of the shape of the composite structure.

8. The method of claim 1, wherein the expandable pallet includes a pair of pallet members interlocked with one another defining the recess therebetween, and the method further comprises:
   driving the plurality of die sections at the angle relative to the expandable pallet causing the pair of pallet members to move outward relative to one another and progressively expand the recess.

9. The method of claim 1, wherein moving the expandable pallet at the translation rate comprises moving the expandable pallet in a linear motion underneath the die conveyor.

10. The method of claim 9, wherein the expandable pallet is expandable in a direction substantially perpendicular to the linear motion.

11. The method of claim 1, further comprising:
    applying a bladder onto the laminated charge as the expandable pallet moves past the die conveyor.

12. A method for forming a composite structure, the method comprising:
    applying a laminated charge onto a plurality of expandable pallets arranged in pairs of pallet members, and each pair is interlocked with one another defining a recess therebetween, wherein the plurality of expandable pallets have a forming surface configured to receive thereon the laminated charge;
    moving the plurality of expandable pallets at a translation rate and relative to a die conveyor that comprises a plurality of die sections; and
    driving the plurality of die sections on the die conveyor at an angle relative to the plurality of expandable pallets so as to drive the plurality of die sections progressively deeper into a recess defined by the pairs of the plurality of expandable pallets and shape the laminated charge into at least part of a shape of the composite structure, wherein a first end of the die conveyor is offset from the forming surface of the plurality of expandable pallets by a first distance and a second end of the die conveyor is offset from the forming surface of the plurality of expandable pallets by a second distance and the first distance is greater than the second distance such that the die conveyor drives the plurality of die sections at the angle relative to the plurality of expandable pallets.

13. The method of claim 12, wherein driving the plurality of die sections on the die conveyor comprises driving the plurality of die sections at a same rate as the translation rate of the plurality of expandable pallets so as to reduce shear between the laminated charge and the plurality of die sections.

14. The method of claim 12, wherein driving the plurality of die sections on the die conveyor comprises driving the plurality of die sections on the die conveyor at a stationary height with respect to the plurality of expandable pallets after driving the plurality of die sections on the die conveyor at the angle relative to the plurality expandable pallet so as to add a dwell time after the laminated charge is shaped into at least part of the shape of the composite structure.

15. The method of claim 12, wherein moving the plurality of expandable pallets at the translation rate comprises moving the plurality of expandable pallets in a linear motion underneath the die conveyor.

16. A method for forming a composite structure, the method comprising:
- applying a laminated charge onto a plurality of expandable pallets arranged in pairs of pallet members, and each pair is interlocked with one another defining a recess therebetween, wherein the plurality of expandable pallets have a forming surface configured to receive thereon the laminated charge;
- moving the plurality of expandable pallets at a translation rate and relative to a die conveyor that comprises a plurality of die sections;
- driving the plurality of die sections on the die conveyor relative to the plurality of expandable pallets so as to drive the plurality of die sections into a recess defined by the pairs of the plurality of expandable pallets and shape the laminated charge into at least part of a shape of the composite structure; and
- driving the plurality of die sections on the die conveyor at a stationary height with respect to the plurality of expandable pallets after shaping the laminated charge into the at least part of the shape of the composite structure to add a dwell time after the laminated charge is shaped, wherein a first end of the die conveyor is offset from the forming surface of the plurality of expandable pallets by a first distance and a second end of the die conveyor is offset from the forming surface of the plurality of expandable pallets by a second distance and the first distance is greater than the second distance such that the die conveyor drives the plurality of die sections at an angle relative to the plurality of expandable pallets.

17. The method of claim 16, wherein moving the plurality of expandable pallets at the translation rate comprises moving the plurality of expandable pallets in a linear motion underneath the die conveyor.

18. The method of claim 16, wherein moving the expandable pallet at the translation rate comprises moving the expandable pallet in a linear motion underneath the die conveyor.

19. The method of claim 16, further comprising:
- applying a bladder onto the laminated charge as the expandable pallet moves past the die conveyor.

20. The method of claim 12, further comprising:
- applying a bladder onto the laminated charge as the expandable pallet moves past the die conveyor.

* * * * *